United States Patent
Lee

(10) Patent No.: US 10,780,747 B2
(45) Date of Patent: Sep. 22, 2020

(54) TIRE STRUCTURE AND COMBINING STRUCTURE THEREOF

(71) Applicant: Young Gi Lee, Gimhae-si (KR)

(72) Inventor: Young Gi Lee, Gimhae-si (KR)

( * ) Notice: Subject to any disclaimer, the term of this patent is extended or adjusted under 35 U.S.C. 154(b) by 0 days.

(21) Appl. No.: 16/441,727

(22) Filed: Jun. 14, 2019

(65) Prior Publication Data

US 2019/0344630 A1    Nov. 14, 2019

Related U.S. Application Data

(63) Continuation of application No. PCT/KR2018/013364, filed on Nov. 6, 2018.

(30) Foreign Application Priority Data

May 14, 2018   (KR) .................. 10-2018-0054854

(51) Int. Cl.
*B60C 5/02*        (2006.01)
*B60C 19/12*       (2006.01)

(52) U.S. Cl.
CPC .............. *B60C 19/127* (2013.01); *B60C 5/02* (2013.01); *B60C 2200/12* (2013.01)

(58) Field of Classification Search
CPC . B60C 17/065; B60C 2200/12; B60C 19/127; B60C 19/12; B60C 5/04; B60C 15/02; B60C 15/022; B60C 15/0209
See application file for complete search history.

(56) References Cited

U.S. PATENT DOCUMENTS

| | | | |
|---|---|---|---|
| 1,477,425 A | 12/1923 | Cataldo | |
| 3,095,917 A | 7/1963 | Arsandaux | |
| 5,129,973 A * | 7/1992 | Suzuki | ...................... B60C 3/04 |
| | | | 152/454 |
| 6,213,179 B1 | 4/2001 | Igarashi | |
| 2012/0214933 A1* | 8/2012 | Lopez | .................. B60C 1/0016 |
| | | | 524/502 |
| 2017/0057286 A1 | 3/2017 | Shaw et al. | |
| 2019/0054778 A1* | 2/2019 | Douglas | ................ B60C 19/122 |

FOREIGN PATENT DOCUMENTS

| | | |
|---|---|---|
| EP | 0441552 | 8/1991 |
| EP | 0940269 | 9/1999 |
| JP | 03292206 | 12/1991 |

(Continued)

OTHER PUBLICATIONS

European Search Report—Application No. 18887223.8 dated Feb. 4, 2020, citing EP 0940269, U.S. Pat. No. 3,095,917, and EP 0441552.

(Continued)

*Primary Examiner* — Robert C Dye
*Assistant Examiner* — Farah Taufiq
(74) *Attorney, Agent, or Firm* — Cantor Colburn LLP

(57) ABSTRACT

Provided is a tire structure capable of being combined with a rim, and the tire structure includes an air tube, a core provided on the air tube, and a tire outer layer provided on the core, and the core includes a body part positioned above a transverse diameter of the air tube and a wing part positioned under the transverse diameter of the air tube, and a lower end of the wing part is placed under an upper surface of the rim.

9 Claims, 10 Drawing Sheets

(56) References Cited

FOREIGN PATENT DOCUMENTS

| | | | |
|---|---|---|---|
| JP | 08164719 | 6/1996 | |
| JP | 10100608 | 4/1998 | |
| JP | 11059147 | 3/1999 | |
| JP | 11245637 | 9/1999 | |
| JP | 106707 A * | 8/2001 | ........... B60C 17/065 |
| JP | 3198050 | 8/2001 | |
| JP | 3335110 | 10/2002 | |
| JP | 2005263101 | 9/2005 | |
| JP | 2009040212 | 2/2009 | |
| KR | 101504591 | 3/2015 | |
| WO | 0043224 | 7/2000 | |

OTHER PUBLICATIONS

Taiwanese Office Action—Taiwanese Application No. 108115478 dated Feb. 25, 2020, citing U.S. Pat. No. 1,477,425 and JP 2005-263101.
Japanese Office Action—Japanese Application No. 2019-149175 dated Jun. 30, 2020, citing JP 3198050, JP 2009-40212, JATMA Year Book, JP 2005-263101, JP 11-245637, JP 11-059147, JP 10-100608, JP 08-164719, JP 03-292206, JP 2017/0057286, and JP 10-1504591.
JATMA Year Book, 2002.

* cited by examiner

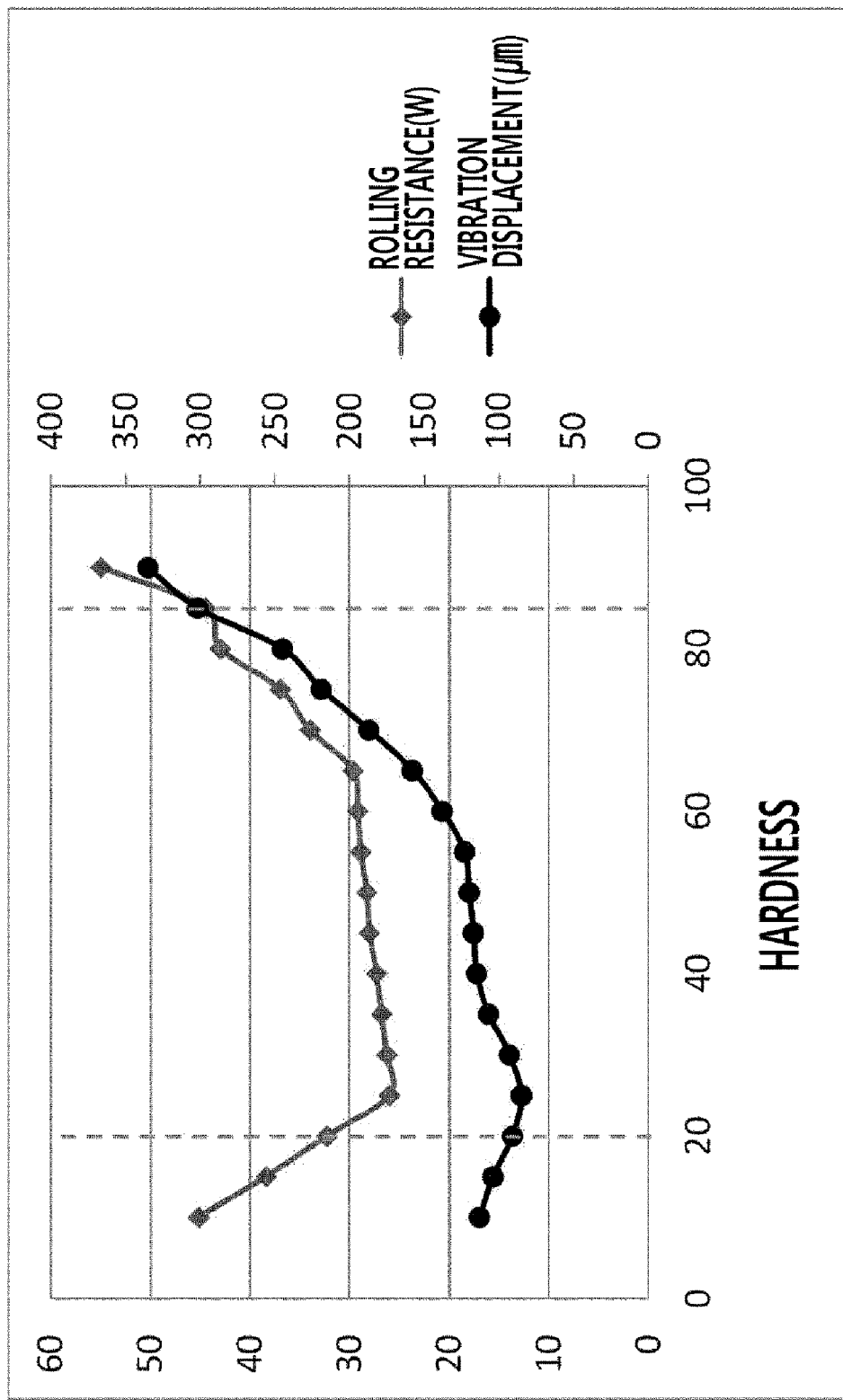

TIRE STRUCTURE AND COMBINING STRUCTURE THEREOF

TECHNICAL FIELD

The present disclosure relates to a tire structure and a combining structure thereof.

BACKGROUND

A growing awareness of eco-friendly and low-carbon exercises has promoted the spread of urban and mountain bikes. A conventionally used air tube tire is highly likely to be punctured and loses air with the passage of long time and thus needs to be inflated with air again. Particularly, if the tire is damaged and punctured by a sharp object such as a nail or the like, the tire may not run, which can result in a very dangerous accident.

Recently, the demand for solid tires instead of air tires has been increasing to solve this problem. A solid tire is made of rubber only without using air and can be used for a longer time than an air tire and is puncture-proof. The solid tire can be attached (or mounted or fixed) to a rim with a fixing pin (i.e., rim fixing unit, a combining unit, etc.).

However, since the solid tire is made of rubber only, it is heavy and has a higher rolling resistance than the air tire.

The background technology of the present disclosure is disclosed in Japanese Patent No. 3335110 which describes a tire that uses a sponge-like rubber material as a buffer to absorb shock from the road surface.

Further, U.S. Patent Laid-open Publication No. 2017-0057286 describes a tire that includes a foam element inserted between an air tube and the tire to suppress a tire puncture.

The above-described prior art documents disclose triple-layered tires having the effect of suppressing a tire puncture, but do not recognize a problem which may occur in the triple-layered tire and measures to solve the problem.

DISCLOSURE OF THE INVENTION

Problems to be Solved by the Invention

The present disclosure is conceived to solve the above-described problem of the conventional technologies and provides a tire structure and a combining structure thereof.

However, problems to be solved by the present disclosure are not limited to the above-described problems. There may be other problems to be solved by the present disclosure.

Means for Solving the Problems

As a technical means for solving the above-described technical problems, a tire structure capable of being combined with a rim according to a first aspect of the present disclosure includes an air tube, a core provided on the air tube, and a tire outer layer provided on the core, and the core includes a body part positioned above a transverse diameter of the air tube and a wing part positioned under the transverse diameter of the air tube, and a lower end of the wing part is placed under an upper surface of the rim.

According to an embodiment of the present disclosure, when the air tube is inflated, a compression ratio of thickness for the body part of the core may be from 10% to 50% or less, but may not be limited thereto.

According to an embodiment of the present disclosure, when the air tube is inflated, a compressed thickness of the body part may include a length in the range of 70% or less of a transverse outer diameter of the tire structure, but may not be limited thereto.

According to an embodiment of the present disclosure, the core may have a shore C hardness of from 20 to 80, but may not be limited thereto.

According to an embodiment of the present disclosure, the core and the tire outer layer may have a shore C hardness ratio of from 0.2 to 1, but may not be limited thereto.

A second aspect of the present disclosure provides a tire combining structure in which the tire structure and a rim including both hooks are combined.

According to an embodiment of the present disclosure, when the air tube is inflated, a ratio B/A between a transverse diameter A of the air tube and a distance B between the hooks may be 0.75 or less and a ratio D/C between a length C from an upper end of the air tube to a boundary corresponding to the transverse diameter and a length D from the boundary to a lower end of the air tube may be 3.3 or less, but may not be limited thereto.

According to an embodiment of the present disclosure, a thickness of the wing part positioned at a contact portion between the hooks of the rim and the tire outer layer may be from 3% to 30% of a distance between both the hooks of the rim, but may not be limited thereto.

According to an embodiment of the present disclosure, in a state where the air tube is inflated, an angle of a tangent line at a contact point between a vertical extension of a wall surface of the rim and the tire outer layer may be in the range of from 20° to 80°, but may not be limited thereto.

According to an embodiment of the present disclosure, a contact portion where the tire outer layer, the core, and the air tube are all in contact with each other may be present in a space under the upper surface of the rim, but may not be limited thereto.

A third aspect of the present disclosure provides a bicycle including the tire combining structure.

The above-described embodiments are provided by way of illustration only and should not be construed as liming the present disclosure. Besides the above-described embodiments, there may be additional embodiments described in the accompanying drawings and the detailed description.

Effects of the Invention

According to the above-described means for solving the problems, the tire structure of the present disclosure includes the core provided on the air tube. Thus, it is possible to suppress damage and puncture in a tire caused by an external stimulus such as a sharp object, e.g., a nail, on the tread during a ride. Further, the tire structure includes the air tube and thus is lighter in weight and has a higher rolling resistance than conventional solid tires.

Any conventional triple-layered tire did not recognize a problem caused by the shape of the core placed on the air tube. The problem is that when a tire rolls during a ride, the air tube is drawn into a space between the core and the tire outer layer, and, thus, the air tube is torn and punctured. However, the tire structure of the present disclosure solves the above-described problem by placing the wing part of the core under the upper surface of the rim.

Referring to the shape of the tire structure according to an embodiment of the present disclosure, when the air tube is inflated, the ratio B/A between the transverse diameter A of the air tube and the distance B between the hooks is 0.75 or less and the ratio D/C between the length C from the upper end of the air tube to the boundary corresponding to the transverse diameter and the length D from the boundary to the lower end of the air tube is 3.3 or less. Thus, when the air tube is torn and punctured by external force applied to a lateral surface of the tire structure, the tire structure can run as a run-flat tire.

The effects to be achieved by the present disclosure are not limited to the above-described effects. There may be other effects to be achieved by the present disclosure.

BRIEF DESCRIPTION OF THE DRAWINGS

FIG. 5 is a graph showing a rolling resistance and a vibration displacement depending on a hardness of a core of a tire structure according to an example of the present disclosure;

BEST MODE FOR CARRYING OUT THE INVENTION

Figure 1:
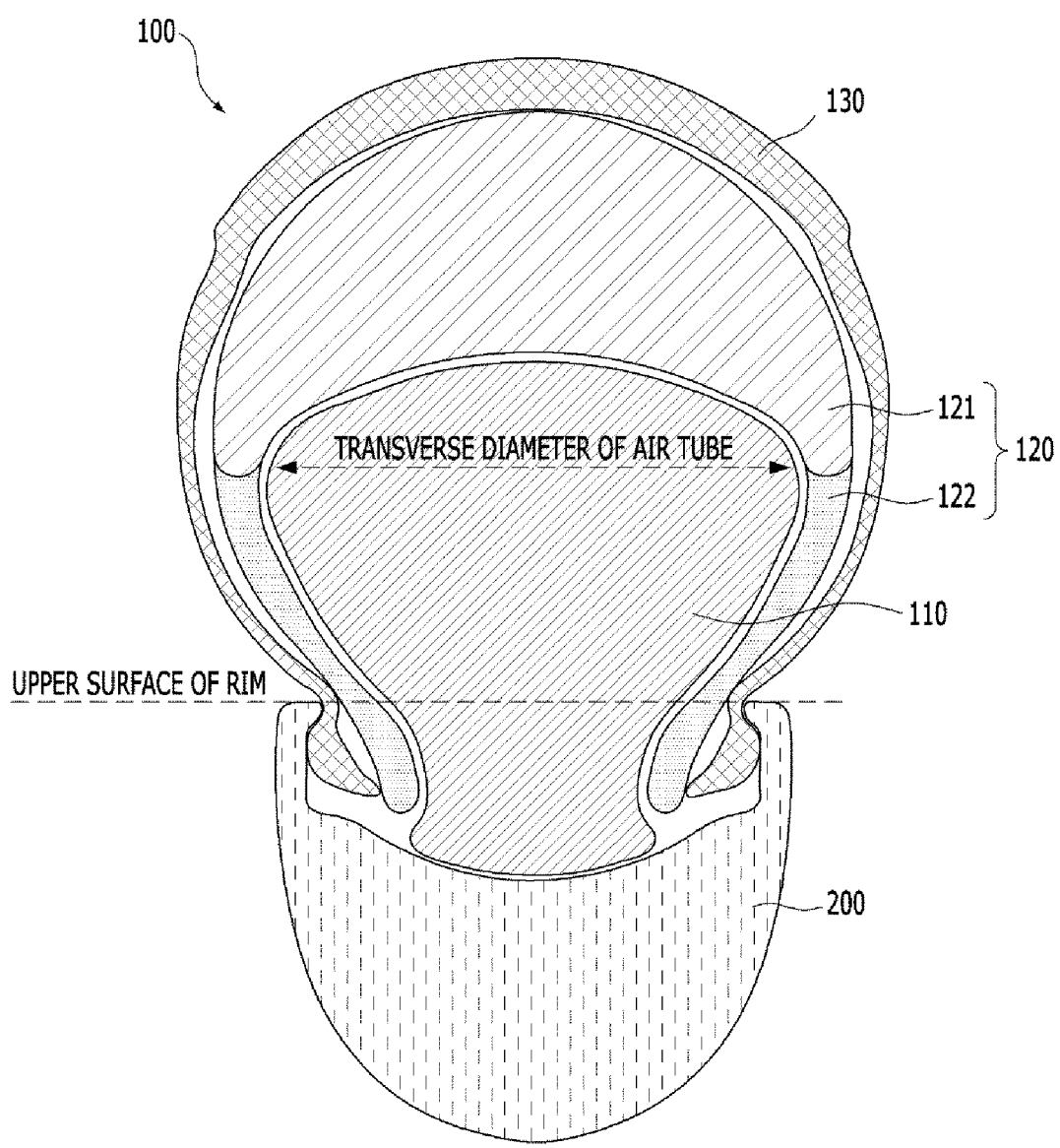
FIG. 1 is a diagram of a tire structure according to an embodiment of the present disclosure.

Hereinafter, embodiments of the present disclosure will be described in detail with reference to the accompanying drawings so that the present disclosure may be readily implemented by those skilled in the art.

However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereafter, a tire structure and a combining structure thereof according to the present disclosure will be described in detail with reference to embodiments, examples, and the accompanying drawings. However, the present disclosure is not limited to the following embodiments, examples, and drawings.

According to a first aspect of the present disclosure, a tire structure which can be combined with a rim includes an air tube, a core provided on the air tube, and a tire outer layer provided on the core, and the core includes a body part positioned above a transverse diameter of the air tube and a wing part positioned under the transverse diameter of the air tube, and a lower end of the wing part is placed under an upper surface of the rim.

FIG. 1 is a diagram of a tire structure according to an embodiment of the present disclosure.

To be specific, FIG. 1 is a plan view of a tire structure 100 according to an embodiment of the present disclosure.

Referring to FIG. 1, the tire structure 100 which can be combined with a rim 200 includes an air tube 110, a core 120 provided on the air tube 110, and a tire outer layer 130 provided on the core 120, the core 120 includes a body part 121 positioned above a transverse diameter of the air tube and a wing part 122 positioned under the transverse diameter of the air tube, and a lower end of the wing part 122 is placed under an upper surface of the rim 200.

The air tube 110 may be a generally used air tube, but may not be limited thereto. For example, a material of the air tube may be rubber consisting of synthetic rubber, natural rubber, and combinations thereof, but may not be limited thereto.

The core 120 may include a material selected from the group consisting of, for example, natural rubber, synthetic rubber, thermosetting resin, thermoplastic resin, and combinations thereof, but may not be limited thereto.

The tire structure 100 according to an embodiment of the present disclosure includes the core 120 provided on the air tube 110. Thus, it is possible to suppress damage and puncture in a tire caused by external shock such as a sharp object, e.g., a nail, on the tread during a ride. Further, the tire structure 100 includes the air tube 110 and thus is lighter in weight and has a higher rolling resistance than conventional solid tires.

Figure 2:
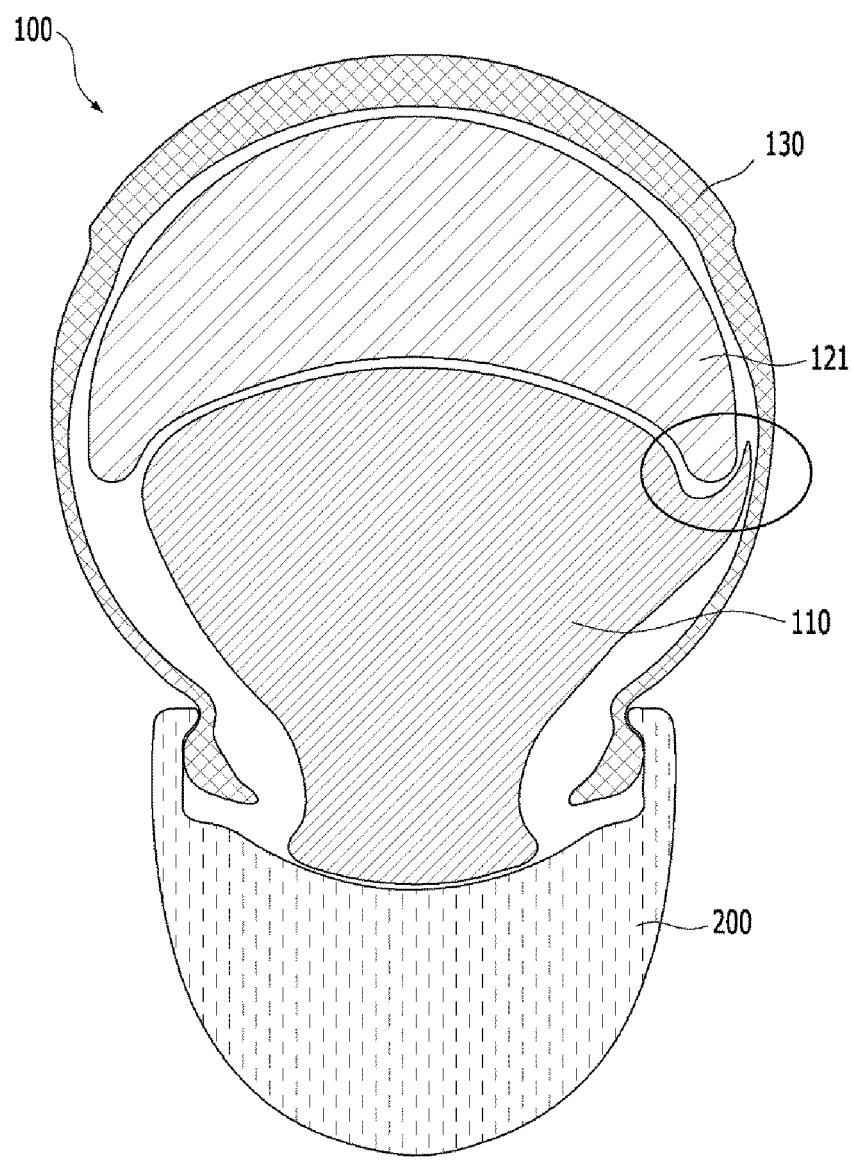
FIG. 2 is a diagram of a tire structure according to a comparative example of the present disclosure.

FIG. 2 is a diagram of a tire structure according to a comparative example of the present disclosure.

To be specific, FIG. 2 is a diagram showing a problem occurring when the wing part 122 of the tire structure 100 is not present or the lower end of the wing part 122 is placed above the upper surface of the rim.

Referring to FIG. 2, if the wing part 122 is not present or the lower end of the wing part 122 is placed above the upper surface of the rim, when the tire structure 100 rolls during a ride, the air tube 110 is drawn (swallowed) into a space between the body part 121 and the tire outer layer 130 (as indicated by a circle in FIG. 2), and, thus, the air tube 110 is torn and punctured.

Hereinafter, the present disclosure will be described in more detail with reference to Example. The following Example is provided only for explanation, but does not intend to limit the scope of the present disclosure.

Example 1

As the conditions of Example 1, a tire ETRTO 37-622 was used and a minimum tire air pressure for external display was set to 80 psi as an air pressure of an air tube.

In the test of Example 1, when the tire rolled clockwise while the tire was in contact with a drum, the drum rolled counterclockwise, and, thus, the mileage of the tire could be checked. In this case, the drum rolled at a speed of 50 km/h and had a weight of 70 kg.

The presence or absence of a puncture depending on a height of the wing part 122 relative to the upper surface of the rim was checked, and the results thereof were as shown in Table 1. To be specific, a limited mileage was set to 300 km and the test was repeated a total of 20 times.

<Evaluation Criteria>
Presence of puncture: O
Absence of puncture: X

TABLE 1

| Position of lower end of wing part (Height relative to upper surface of rim, mm) | | Number of punctures depending on mileage | | | Total number of punctures (n/20) | Presence or absence of puncture |
|---|---|---|---|---|---|---|
| | | 100 km | 200 km | 300 km | | |
| Above | +10.0 | 20 | — | — | 20 | o |
| | +9.0 | 20 | — | — | 20 | o |
| | +8.0 | 20 | — | — | 20 | o |
| | +7.0 | 15 | 3 | 1 | 19 | o |
| | +6.0 | 13 | 5 | 1 | 19 | o |
| | +5.0 | 12 | 7 | 1 | 20 | o |
| | +4.5 | 11 | 7 | 2 | 20 | o |
| | +4.0 | 10 | 8 | 2 | 20 | o |
| | +3.5 | 8 | 7 | 4 | 19 | o |
| | +3.0 | 8 | 7 | 5 | 20 | o |
| | +2.5 | 5 | 6 | 9 | 20 | o |
| | +2.0 | 2 | 4 | 7 | 13 | o |
| | +1.5 | 2 | 3 | 7 | 12 | o |
| | +1.0 | 1 | 3 | 5 | 9 | o |
| | +0.5 | 1 | 1 | 2 | 4 | o |
| Under | 0 | 0 | 0 | 0 | 0 | x |
| | −0.5 | 0 | 0 | 0 | 0 | x |
| | −1.0 | 0 | 0 | 0 | 0 | x |
| | −1.5 | 0 | 0 | 0 | 0 | x |
| | −2.0 | 0 | 0 | 0 | 0 | x |
| | −2.5 | 0 | 0 | 0 | 0 | x |
| | −3.0 | 0 | 0 | 0 | 0 | x |
| | −3.5 | 0 | 0 | 0 | 0 | x |
| | −4.0 | 0 | 0 | 0 | 0 | x |
| | −4.5 | 0 | 0 | 0 | 0 | x |
| | −5.0 | 0 | 0 | 0 | 0 | x |

According to the results shown in Table 1, it can be seen that when the lower end of the wing part 122 is placed above the upper surface of the rim, there is a puncture, whereas when it is placed under the upper surface of the rim, there is no puncture.

Any conventional triple-layered tire did not recognize a problem caused by the shape of the core placed on the air tube. The problem is that when a tire rolls during a ride, the air tube is drawn into a space between the core and the tire outer layer, and, thus, the air tube is torn and punctured. However, the tire structure of the present disclosure solves the above-described problem by placing the wing part of the core under the upper surface of the rim.

According to an embodiment of the present disclosure, when the air tube 110 is inflated, a compression ratio of thickness for the body part 121 of the core 120 may be from 10% to 50% or less, but may not be limited thereto.

Figure 4A:
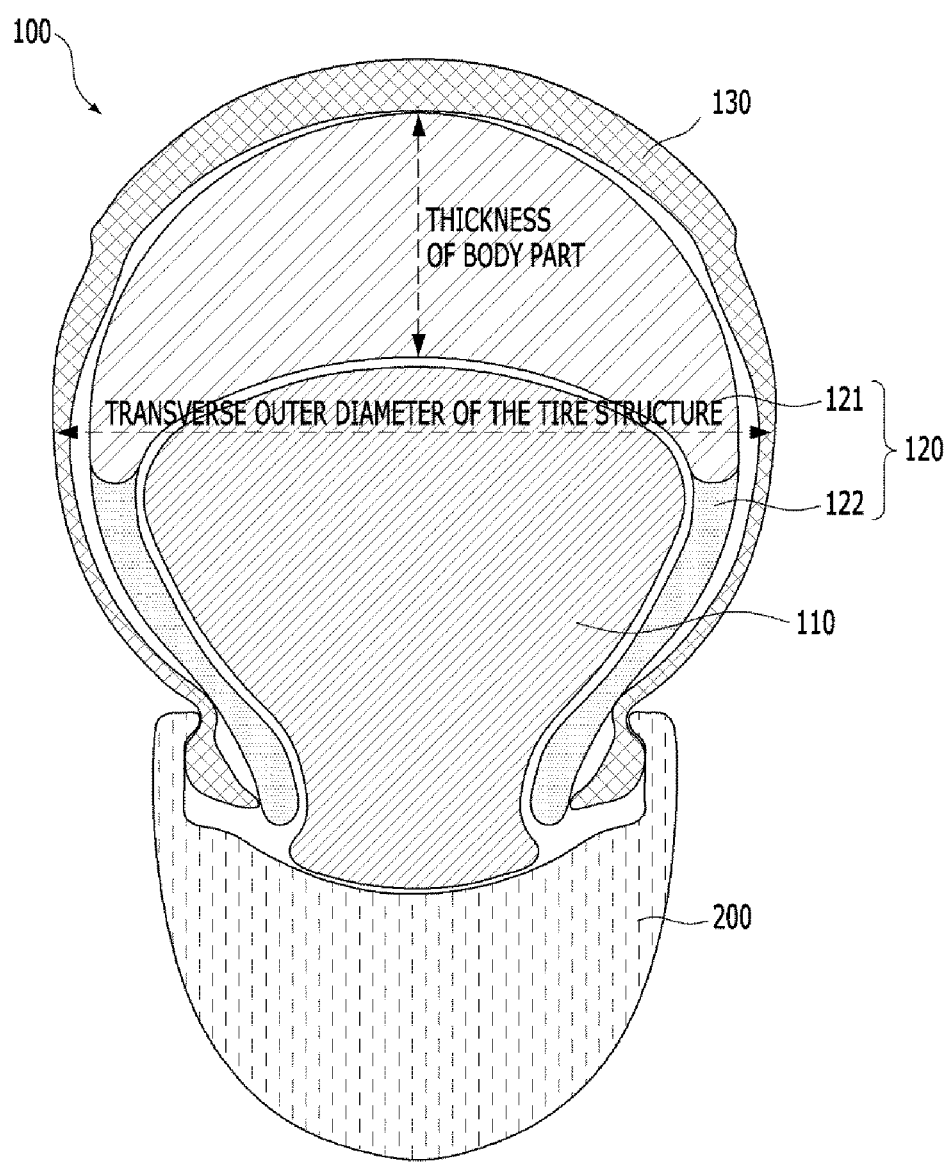
FIG. 4A is a diagram showing the body part of the tire structure according to an embodiment of the present disclosure before compression and FIG. 4B is a diagram showing the body part of the tire structure according to an embodiment of the present disclosure after compression.
Figure 4B:
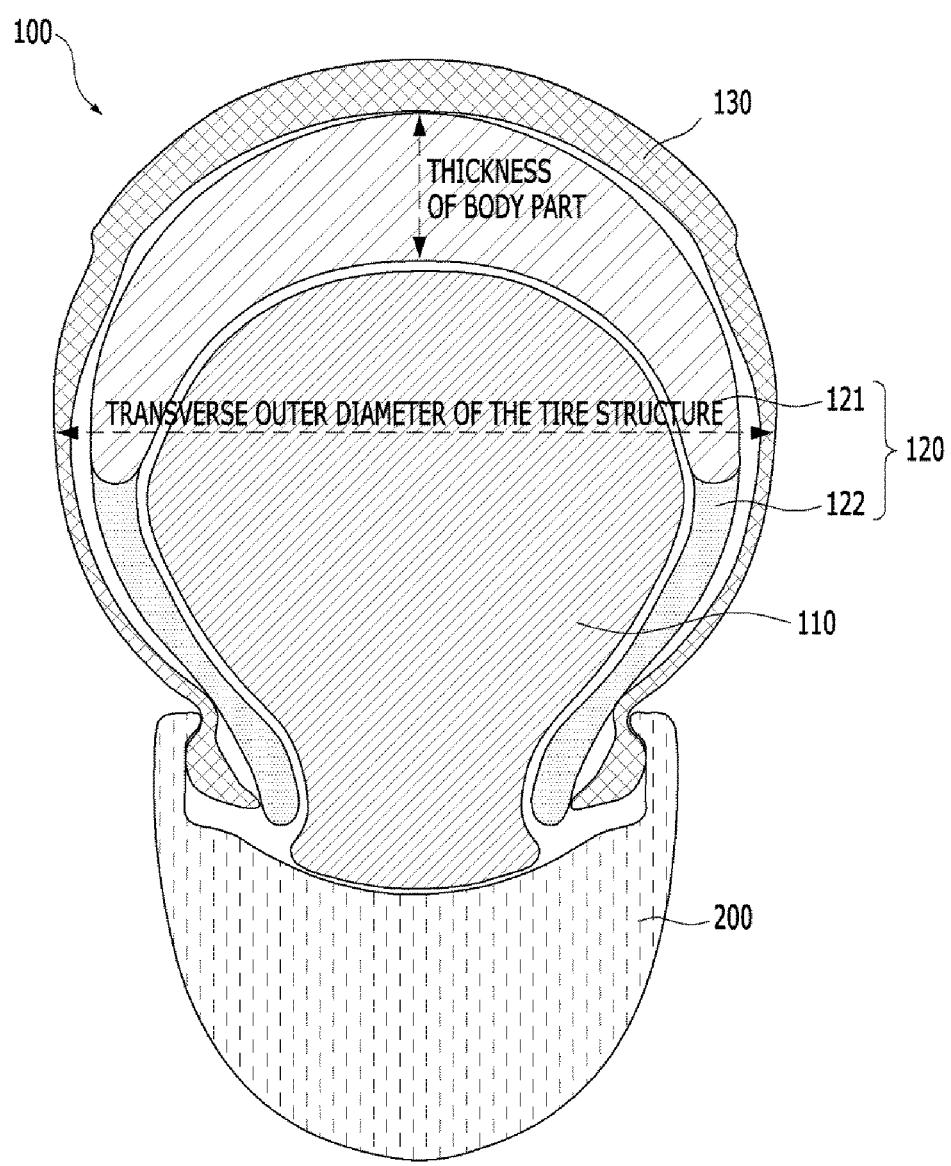

FIG. 4A is a diagram showing the body part of the tire structure according to an embodiment of the present disclosure before compression and FIG. 4B is a diagram showing the body part of the tire structure according to an embodiment of the present disclosure after compression.

The compression refers to compression of the body part 121 of the core 120 while the air tube 110 is inflated when air is put into the air tube 110.

The compression ratio of thickness for the body part 121 may refer to "the thickness of the body part after the compression of the body part/the thickness of the body part before the compression of the body part", but may not be limited thereto.

To be specific, referring to FIG. 4, the compression ratio of thickness for the body part 121 may refer to "the thickness of the body part shown in FIG. 4B/the thickness of the body part shown in FIG. 4A", but may not be limited thereto.

To be specific, when air is put into the air tube 110, the body part 121 of the core 120 may be compressed while the air tube 110 is inflated. In this case, if the compression ratio of thickness for the body part 121 is less than 10%, a rolling resistance is too high, and if the compression ratio of thickness for the body part 121 is more than 50%, the rolling resistance is satisfactory but the fatigue of the air tube 110 is increased, which may result in a puncture of the air tube 110.

To be specific, when a conventionally used air tube is used as the air tube 110, the air tube has a limited inflation volume. However, if the air tube is inflated until the compression ratio of thickness for the body part 121 exceeds 50%, the air tube is inflated beyond the volume limit and thus degraded in durability and then punctured. To be brief, this is based on the same principle that when air is put into a balloon, if the balloon is inflated beyond its volume limit, the balloon bursts. Further, when the compression ratio of thickness for the body part 121 is 80% or more, the strain of the tire structure 100 is increased. To be specific, an increase in the compression ratio of thickness for the body part 121 to 80% or more means that the body part 121 has high strain. In general, as the strain of a tire is increased, the conversion to heat energy is increased and thus a rolling resistance is increased.

Hereinafter, the present disclosure will be described in more detail with reference to Example. The following Example is provided only for explanation, but does not intend to limit the scope of the present disclosure.

Example 2

As the conditions of Example 2, a tire ETRTO 37-622 was used and a minimum tire air pressure for external display was set to 80 psi as an air pressure of an air tube.

In the test of Example 2, when the tire rolled clockwise while the tire was in contact with a drum, the drum rolled counterclockwise, and, thus, the mileage of the tire could be checked. In this case, the drum rolled at a speed of 50 km/h and had a weight of 70 kg.

The compression ratio of the core of Example 2 was adjusted by adjusting a foaming ratio of the core under the same mixing conditions.

The rolling resistance of Example 2 was measured using a torque cell, and after idling for 5 minutes, an average value during a period of time from 20 seconds to 140 seconds after the start of rolling was obtained.

Figure 3:
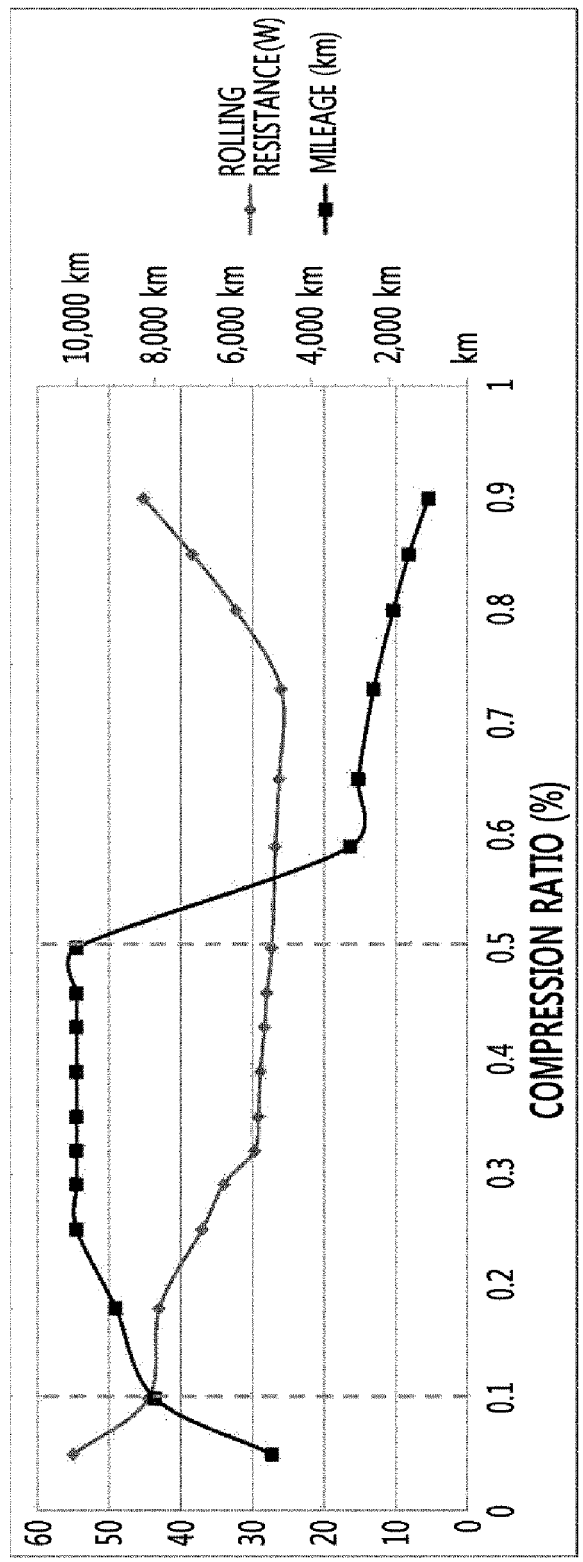
FIG. 3 is a graph showing a rolling resistance and a mileage depending on a compression ratio of a body part of a tire structure according to an example of the present disclosure.

The rolling resistance and the mileage depending on the compression ratio of the body part were as shown in Table 2 and FIG. 3.

<Evaluation Criteria>

Rolling resistance: The tire was evaluated as satisfying a rolling resistance requirement when the tire had a rolling resistance of 45 W or less at a driving speed of 20 km/h and a rolling resistance of 60 W or less at a driving speed of 30 km/h.

Tire durability: The tire was evaluated as satisfying a tire durability requirement when the tire has a mileage of 5,000 km or more.

TABLE 2

| Compression ratio of body part of core (%) | Rolling resistance 20 km/h (W) | Rolling resistance 30 km/h (W) | Mileage of tire (using the same tube) (km) |
|---|---|---|---|
| 5% | 55 | 72.6 | 5,000 km |
| 10% | 44.5 | 60.3 | 8,000 km |
| 18% | 43 | 59 | 9,000 km |
| 25% | 37 | 53.2 | 10,000 km |
| 29% | 34 | 50.1 | 10,000 km |
| 32% | 29.7 | 46.1 | 10,000 km |
| 35% | 29.2 | 45.7 | 10,000 km |
| 39% | 28.9 | 45 | 10,000 km |
| 43% | 28.3 | 44.6 | 10,000 km |
| 46% | 28 | 44 | 10,000 km |
| 50% | 27.3 | 43 | 10,000 km |
| 59% | 26.8 | 42.3 | 3,000 km |
| 65% | 26.3 | 41.8 | 2,800 km |
| 73% | 26 | 41.3 | 2,400 km |
| 80% | 32.3 | 56.6 | 1,900 km |
| 85% | 38.4 | 64.3 | 1,500 km |
| 90% | 45.2 | 71.6 | 1,000 km |

According to the results shown in Table 2, when the compression ratio of the body part of the core is 10% or less, the rolling resistance is greater than the rolling resistance requirement. Further, when the compression ratio of the body part is from 50% to 80%, the rolling resistance satisfies the rolling resistance requirement but the mileage is not satisfactory. This is because the fatigue is increased due to excessive inflation of the air tube and the air tube is punctured during a ride. Furthermore, when the compression ratio of the body part is 80% or more, the strain of the tire is increased. Therefore, the conversion to heat energy is increased and thus the rolling resistance becomes greater than the rolling resistance requirement.

FIG. 3 is a graph showing a rolling resistance and a mileage depending on a compression ratio of a body part of a tire structure according to an example of the present disclosure.

To be specific, FIG. 3 is a graph of the rolling resistance and the mileage at a speed of 20 km/h depending on the compression ratio of the body part shown in Table 2.

Referring to the results of Example 2 as shown in Table 2 and FIG. 3, it can be seen that the compression ratio of thickness for the body part 121 according to an embodiment of the present disclosure is from 10% to 50% or less, but may not be limited thereto. More desirably, the compression ratio of thickness for the body part 121 may be from 30% to 50% or less, but may not be limited thereto.

According to an embodiment of the present disclosure, when the air tube is inflated, a compressed thickness of the body part may include a length in the range of 70% or less of a transverse outer diameter of the tire structure, but may not be limited thereto.

FIG. 4A is a diagram showing the body part of the tire structure according to an embodiment of the present disclosure before compression and FIG. 4B is a diagram showing the body part of the tire structure according to an embodiment of the present disclosure after compression.

To be specific, FIG. 4A is a plan view of the tire structure 100 showing a transverse outer diameter of the tire structure 100 and a thickness of the body part before compression, and FIG. 4B is a plan view of the tire structure 100 showing a transverse outer diameter of the tire structure 100 and a compressed thickness of the body part.

The transverse outer diameter of the tire structure may be a transverse outer diameter of the tire outer layer, but may not be limited thereto.

When the air tube 110 is inflated, the compressed thickness of the body part 121 may be in the range of 70% or less and more desirably from 20% to 70% or less of the transverse outer diameter of the tire structure 100, but may not be limited thereto.

When the compressed thickness of the body part 121 is greater than 70% of the transverse outer diameter of the tire structure 100, the body part 121 is too thick in thickness, and, thus, it is difficult to mount the tire structure to the rim. Further, if the tire structure is forced to be mounted to the rim and then used for a ride, the air tube 110 may be twisted or folded or the core 120 may be twisted, which becomes a major cause of puncture.

When the compressed thickness of the body part 121 is smaller than 20% of the transverse outer diameter of the tire structure 100, the core 120 is thin in thickness, and, thus, the air tube 110 cannot be sufficiently protected against an external stimulus on the tread during a ride and may be punctured.

Hereinafter, the present disclosure will be described in more detail with reference to Example. The following Example is provided only for explanation, but does not intend to limit the scope of the present disclosure.

Example 3

As the conditions of Example 3, a tire ETRTO 37-622 was used and a minimum tire air pressure for external display was set to 80 psi as an air pressure of an air tube.

In the test of Example 3, when the tire rolled clockwise while the tire was in contact with a drum, the drum rolled counterclockwise, and, thus, the mileage of the tire could be checked. In this case, the drum rolled at a speed of 50 km/h and had a weight of 70 kg, and the mileage was 4,000 km.

Further, in order to check the presence or absence of puncture by an external stimulus, the tire was set to roll on commercial 9.8 mm tacks.

The easiness of combination of Example 3 was checked by pressing both sides of the body part corresponding to a diameter line of the body part of the core and measuring a weight value (kgf) when inner surfaces of the body part are in contact with each other.

The easiness of combination and the presence or absence of puncture depending on a ratio x/y of a thickness x of the body part to a transverse outer diameter y of the tire structure were checked, and the results thereof were as shown in Table 3.

<Evaluation Criteria>

Easiness of combination: The easiness of combination was evaluated as excellent when a weight value was 27 kgf or less.

Presence of puncture: O

Absence of puncture: X

TABLE 3

| Ratio (x/y) | Easiness of combination (kgf) | Presence or absence of puncture |
|---|---|---|
| 15% | 2.3 | O |
| 16% | 2.5 | O |
| 18% | 3.1 | O |
| 19% | 3.4 | O |
| 20% | 3.8 | X |
| 22% | 4.2 | X |
| 23% | 4.6 | X |
| 24% | 5.0 | X |
| 26% | 5.4 | X |
| 27% | 5.8 | X |
| 28% | 6.2 | X |
| 30% | 6.6 | X |
| 31% | 8.0 | X |
| 32% | 8.3 | X |
| 34% | 8.9 | X |
| 35% | 9.5 | X |
| 36% | 10.2 | X |
| 38% | 10.8 | X |
| 39% | 11.5 | X |
| 41% | 12.1 | X |
| 42% | 12.8 | X |
| 43% | 13.4 | X |
| 45% | 14.1 | X |
| 46% | 14.7 | X |
| 47% | 15.4 | X |
| 49% | 16.0 | X |
| 50% | 16.7 | X |
| 51% | 17.3 | X |
| 53% | 18.0 | X |
| 54% | 18.6 | X |
| 55% | 19.3 | X |
| 57% | 19.9 | X |
| 58% | 20.6 | X |
| 59% | 21.2 | X |
| 61% | 21.9 | X |
| 62% | 22.5 | X |
| 64% | 23.2 | X |
| 65% | 23.8 | X |
| 66% | 24.5 | X |
| 68% | 25.1 | X |
| 69% | 25.8 | X |
| 70% | 26.4 | X |
| 72% | 27.1 | O |
| 73% | 27.7 | O |
| 74% | 28.4 | O |
| 76% | 29.0 | O |

According to the results shown in Table 3, when the compressed thickness x of the body part was 70% or more of the transverse outer diameter y of the tire structure, a puncture was not observed. When the ratio was greater than 70%, the weight value was greater than 27 kgf. That is, when the tire which is not easily combined but forced to be mounted is used for a ride, the air tube may be twisted or folded or the core may be twisted, and, thus, the tire may be punctured. Further, when the ratio is smaller than 20%, the easiness of combination is satisfactory but the core is too thin in thickness, and, thus, the tire can be easily punctured by an external stimulus like inflatable tires.

According to an embodiment of the present disclosure, the core may have a shore C hardness of from 20 to 80, but may not be limited thereto.

When the core 120 has a shore C hardness of less than 20, the rolling resistance of the tire structure 100 may be high. This is because when the core 120 has a too low hardness, the strain of the tire structure 100 is increased and the conversion to heat energy is increased, and, thus, the rolling resistance is increased. Further, when the core 120 has a shore C hardness of more than 80, the ride comfort of the tire may deteriorate.

Hereinafter, the present disclosure will be described in more detail with reference to Example. The following Example is provided only for explanation, but does not intend to limit the scope of the present disclosure.

Example 4

As the conditions of Example 4, a tire ETRTO 37-622 was used and a minimum tire air pressure for external display was set to 80 psi as an air pressure of an air tube.

In the test of Example 4, when the tire rolled clockwise while the tire was in contact with a drum, the drum rolled counterclockwise, and, thus, the mileage of the tire could be checked. In this case, the drum rolled at a speed of 50 km/h and had a weight of 70 kg.

The hardness of the core of Example 4 was adjusted by adjusting a foaming ratio of the core under the same mixing conditions.

The hardness of the core of Example 4 was measured by applying ASTM D 2240 standard method of test for hardness.

The rolling resistance of Example 4 was measured using a torque cell, and after idling for 5 minutes, an average value during a period of time from 20 seconds to 140 seconds after the start of rolling was obtained.

The vibration of Example 4 was measured using a vibrator capable of measuring μm, and after a ride at the same speed for 5 minutes to keep the balance of the tire, an average value during a period of time from 20 seconds to 140 seconds after the start of rolling was obtained.

The rolling resistance and the vibration depending on the shore C hardness of the core were as shown in Table 4 and FIG. 5.

<Evaluation Criteria>

Rolling resistance: The tire was evaluated as satisfying a rolling resistance requirement when the tire had a rolling resistance of 45 W or less at a driving speed of 20 km/h and a rolling resistance of 60 W or less at a driving speed of 30 km/h.

Ride comfort: The tire was evaluated as satisfying a ride comfort requirement when the tire had a vibration displacement of 250 μm or less at a driving speed of 20 km/h and a vibration displacement of 550 μm or less at a driving speed of 30 km/h.

Presence of puncture: O
Absence of puncture: X

TABLE 4

| Hardness (Shore C) | Rolling resistance 20 km/h (W) | Rolling resistance 30 km/h (W) | Vibration measurement 20 km/h (μm) | Vibration measurement 30 km/h (μm) | Presence or absence of puncture during ride at 500 km |
|---|---|---|---|---|---|
| 90 | 55 | 72.6 | 335 | 659 | X |
| 85 | 44.5 | 60.3 | 302 | 624 | X |
| 80 | 43 | 59 | 245 | 543 | O |
| 75 | 37 | 53.2 | 219 | 439 | O |
| 70 | 34 | 50.1 | 187 | 357 | O |
| 65 | 29.7 | 46.1 | 158 | 317 | O |
| 60 | 29.2 | 45.7 | 138 | 274 | O |
| 55 | 28.9 | 45 | 123 | 250 | O |
| 50 | 28.3 | 44.6 | 120 | 247 | O |
| 45 | 28 | 44 | 117 | 242 | O |
| 40 | 27.3 | 43 | 115 | 227 | O |
| 35 | 26.8 | 42.3 | 107 | 200 | O |
| 30 | 26.3 | 41.8 | 93 | 185 | O |
| 25 | 26 | 41.3 | 85 | 160 | O |
| 20 | 32.3 | 56.6 | 91 | 135 | O |
| 15 | 38.4 | 64.3 | 104 | 193 | X |
| 10 | 45.2 | 71.6 | 113 | 218 | X |

According to the results shown in Table 4, when the hardness (shore C) of the core is less than 20, the rolling resistance is greater than the rolling resistance requirement. This is because when the core has a too low hardness, the strain of the tire structure is increased and the conversion to heat energy is increased, and, thus, the rolling resistance becomes greater than the rolling resistance requirement. Further, wear occurs due to a difference in the hardness between the tire outer layer and the core, and, thus, the tire may be punctured. When the hardness of the core is more than 80, the rolling resistance is greater than the rolling resistance requirement and a vibration displacement value is greater than a reference, and, thus, ride comfort may deteriorate. This is because when the core has a too high hardness, shock on the tread of the tire cannot be sufficiently absorbed during a ride. Therefore, the durability of the tire structure may deteriorate, and, thus, the tire may be punctured during a ride.

FIG. 5 is a graph showing a rolling resistance and a vibration displacement depending on a hardness of a core of a tire structure according to an example of the present disclosure.

To be specific, FIG. 5 is a graph of the rolling resistance and the vibration displacement at a speed of 20 km/h depending on the hardness of the core shown in Table 4.

Referring to the results of Example 4 as shown in Table 4 and FIG. 5, it can be seen that the shore C hardness of the core 120 according to an embodiment of the present disclosure may be from 20 to 80 or less, but may not be limited thereto.

According to an embodiment of the present disclosure, the core and the tire outer layer may have a shore C hardness ratio of from 0.2 to 1, but may not be limited thereto.

The ratio may represent "the shore C hardness of the core/the shore C hardness of the tire outer layer"

When the shore C hardness ratio between the core 120 and the tire outer layer 130 is less than 0.2 or more than 1, a difference in the shore C hardness between the core 120 and the tire outer layer 130 is too large, wear occurs between the core 120 and the tire outer layer 130 during a ride. In his case, debris caused by the wear adheres to the core 120 or the tire outer layer 130 and serves as a tack and results in a puncture.

Hereinafter, the present disclosure will be described in more detail with reference to Example. The following Example is provided only for explanation, but does not intend to limit the scope of the present disclosure.

Example 5

As the conditions of Example 5, a tire ETRTO 37-622 was used and a minimum tire air pressure for external display was set to 80 psi as an air pressure of an air tube.

In the test of Example 5, when the tire rolled clockwise while the tire was in contact with a drum, the drum rolled counterclockwise, and, thus, the mileage of the tire could be checked. In this case, the drum rolled at a speed of 50 km/h and had a weight of 70 kg.

The wear depending on the hardness ratio between the core and the tire outer layer was as shown in Table 5.

<Evaluation Criteria>

1 cycle: Mileage of 1 km or 419.04 revolutions of the drum

Wear: The core and the inside of the tire outer layer were checked every 100 cycles to check whether they started to show wear, and any cycle at which they started to show wear was marked as wear. Since the wear of 500 cycle is a minimum cycle required for the tire structure, the core, and the tube to settle stably, the tire was evaluated as satisfying a wear requirement when the tire had wear of 500 cycle or more.

TABLE 5

| Hardness ratio (Hardness of core/ Hardness of tire outer layer) | Wear |
|---|---|
| 1.06 | 300 cycle |
| 1.00 | 900 cycle |
| 0.94 | 1,100 cycle |
| 0.88 | 1,500 cycle |
| 0.82 | 2,000 cycle |
| 0.76 | 2,400 cycle |
| 0.71 | 2,800 cycle |
| 0.65 | 3,000 cycle |
| 0.59 | 3,000 cycle |
| 0.53 | 2,700 cycle |
| 0.47 | 2,500 cycle |
| 0.41 | 2,000 cycle |
| 0.35 | 1,500 cycle |
| 0.29 | 900 cycle |
| 0.24 | 700 cycle |
| 0.18 | 200 cycle |

According to the results shown in Table 5, when the hardness ratio (the hardness of the core/the hardness of the tire outer layer) is more than 1 or less than 0.2, a cycle number at which wear starts is small. That is, when the hardness ratio is more than 1 or less than 0.2, the wear starts earlier. To be specific, the wear occurs earlier due to a difference in the hardness between the core and the tire outer layer, and, thus, debris caused by the wear may adhere to the core or the surface of the tire outer layer and serve as a tack and result in a puncture.

A second aspect of the present disclosure provides a tire combining structure in which the tire structure and a rim including both hooks are combined.

Detailed descriptions of the tire combining structure of the second aspect of the present disclosure, which overlap with those of the first aspect of the present disclosure, are omitted hereinafter, but the descriptions of the first aspect of the present disclosure may be identically applied to the second aspect of the present disclosure, even though they are omitted hereinafter.

Figure 6:
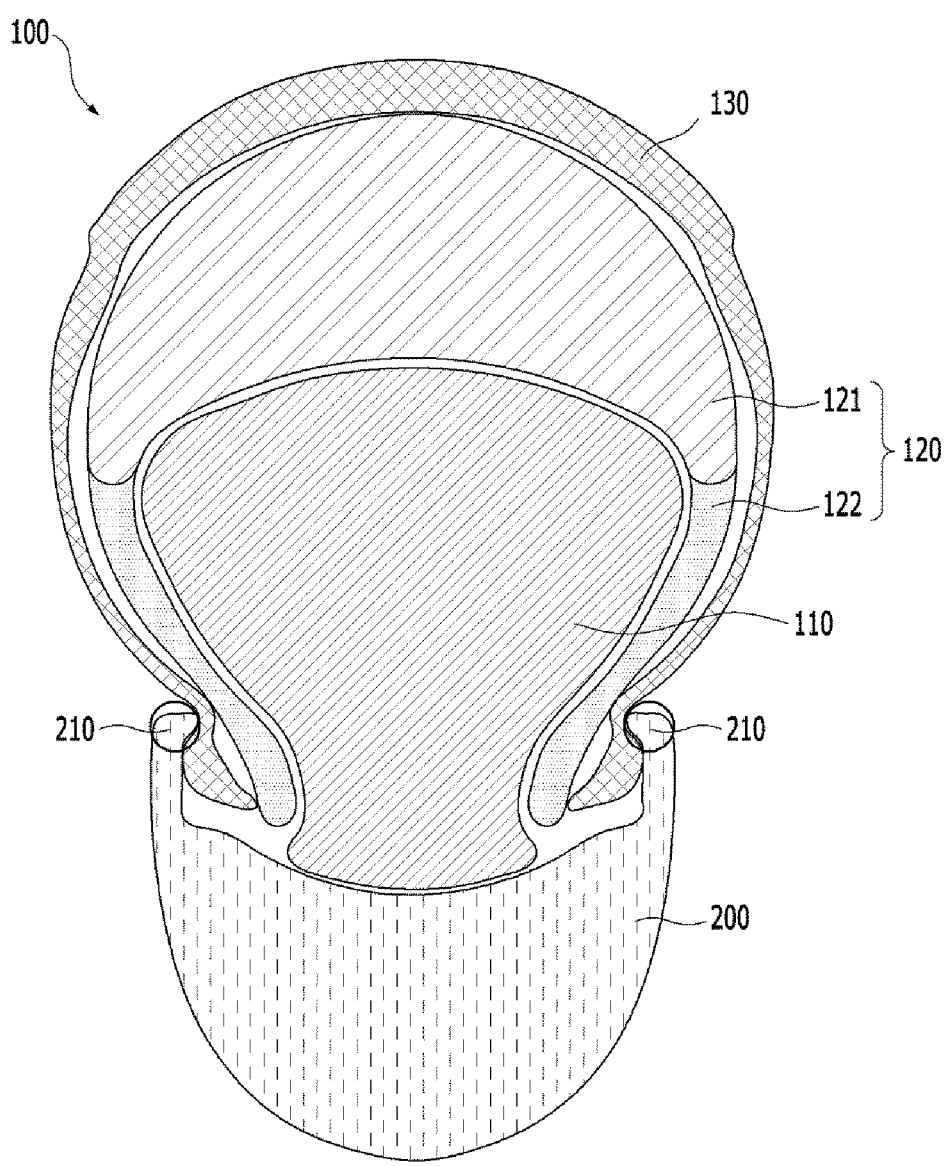
FIG. 6 is a diagram illustrating a tire combining structure according to an embodiment of the present disclosure.

FIG. 6 is a diagram illustrating a tire combining structure according to an embodiment of the present disclosure.

To be specific, FIG. 6 is a plan view illustrating the tire combining structure in which the tire structure 100 and the rim 200 including both hooks 210 are combined according to an embodiment of the present disclosure.

Referring to FIG. 6, in the tire combining structure, the tire structure 100 may be combined with the rim 200 including the both hooks 210 as shown in the drawing, but may not be limited thereto.

The tire combining structure may show an example where the tire structure 100 is combined with a bicycle or the like, but may not be limited thereto.

According to an embodiment of the present disclosure, when the air tube is inflated, a ratio B/A between a transverse diameter A of the air tube and a distance B between the hooks may be 0.75 or less and a ratio D/C between a length C from an upper end of the air tube to a boundary corresponding to the transverse diameter and a length D from the boundary to a lower end of the air tube may be 3.3 or less, but may not be limited thereto.

Figure 7:
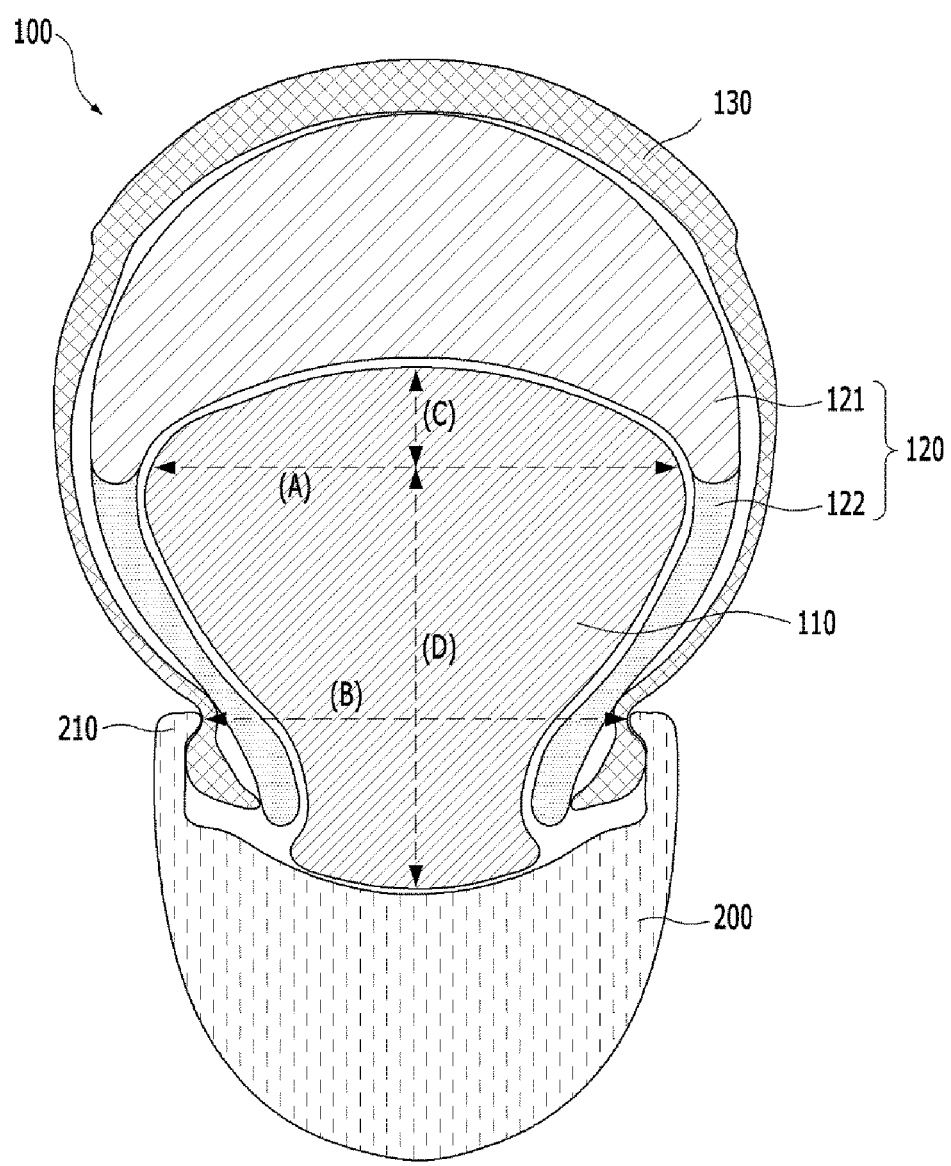
FIG. 7 is a diagram of a tire combining structure according to an embodiment of the present disclosure.

FIG. 7 is a diagram of a tire combining structure according to an embodiment of the present disclosure.

Referring to FIG. 7, when the air tube 110 is inflated, a ratio B/A between a transverse diameter A of the air tube and a distance B between the hooks may be 0.75 or less and a ratio D/C between a length C from an upper end of the air tube 110 to a boundary corresponding to the transverse diameter and a length D from the boundary to a lower end of the air tube 110 may be 3.3 or less, but may not be limited thereto.

The air tube 110 may be torn and punctured by external force applied to a lateral surface of the tire structure 100. In this case, when the ratio B/A is 0.75 or less and the ratio D/C is 3.3 or less, the tire structure 100 can run as a run-flat tire. The run-flat means a state in which the tire structure 100 does not deviate from the rim 200 when turning 60° to the left or right with respect to a straight direction while the tire runs at a speed of 10 km/h after the air tube 110 is torn.

Hereinafter, the present disclosure will be described in more detail with reference to Example. The following Example is provided only for explanation, but does not intend to limit the scope of the present disclosure.

Example 6

As the conditions of Example 6, a tire ETRTO 37-622 was used. In this case, an air tube was torn or not present, and a bicycle with the tire ran at a speed of 10 km per hour.

The run-flat state depending on the ratio B/A and the ratio D/C was checked, and the results thereof were as shown in Table 6 and Table 7, respectively.

<Evaluation Criteria>

If the tire does not deviate from the rim when turning 60° to the left or right with respect to a straight direction straight direction: O If the tire deviates from the rim when turning 60° to the left or right with respect to a straight direction straight direction: X

TABLE 6

| B/A ratio | Run Flat |
| --- | --- |
| 10% | O |
| 20% | O |
| 30% | O |
| 40% | O |
| 50% | O |
| 60% | O |
| 70% | O |
| 80% | X |
| 90% | X |
| 100% | X |
| 110% | X |
| 120% | X |
| 130% | X |
| 140% | X |
| 150% | X |
| 160% | X |
| 170% | X |
| 180% | X |
| 190% | X |
| 200% | X |

TABLE 7

| D/C ratio | Run Flat |
| --- | --- |
| 10% | O |
| 20% | O |
| 30% | O |
| 40% | O |
| 50% | O |
| 60% | O |
| 70% | O |
| 80% | O |
| 90% | O |
| 100% | O |
| 110% | O |
| 120% | O |
| 130% | O |
| 140% | O |
| 150% | O |
| 160% | O |
| 170% | O |
| 180% | O |
| 190% | O |
| 200% | O |
| 210% | O |
| 220% | O |
| 230% | O |
| 240% | O |
| 250% | O |
| 260% | O |
| 270% | O |
| 280% | O |
| 290% | O |
| 300% | O |
| 310% | O |
| 320% | O |
| 330% | O |
| 340% | X |
| 350% | X |
| 360% | X |
| 370% | X |
| 380% | X |
| 390% | X |
| 400% | X |

According to the results shown in Table 6 and Table 7, if the tire has a shape in which the ratio B/A between the transverse diameter A of the air tube and the distance B between the hooks is 0.75 or less and the ratio D/C between the length C from the upper end of the air tube to the boundary corresponding to the transverse diameter and the length D from the boundary to the lower end of the air tube is 3.3 or less, the tire can serve as a run-flat tire which can run even when punctured.

According to an embodiment of the present disclosure, a thickness of the wing part positioned at a contact portion between the hooks of the rim and the tire outer layer may be from 3% to 30% of a distance between the both hooks of the rim, but may not be limited thereto.

Figure 8:
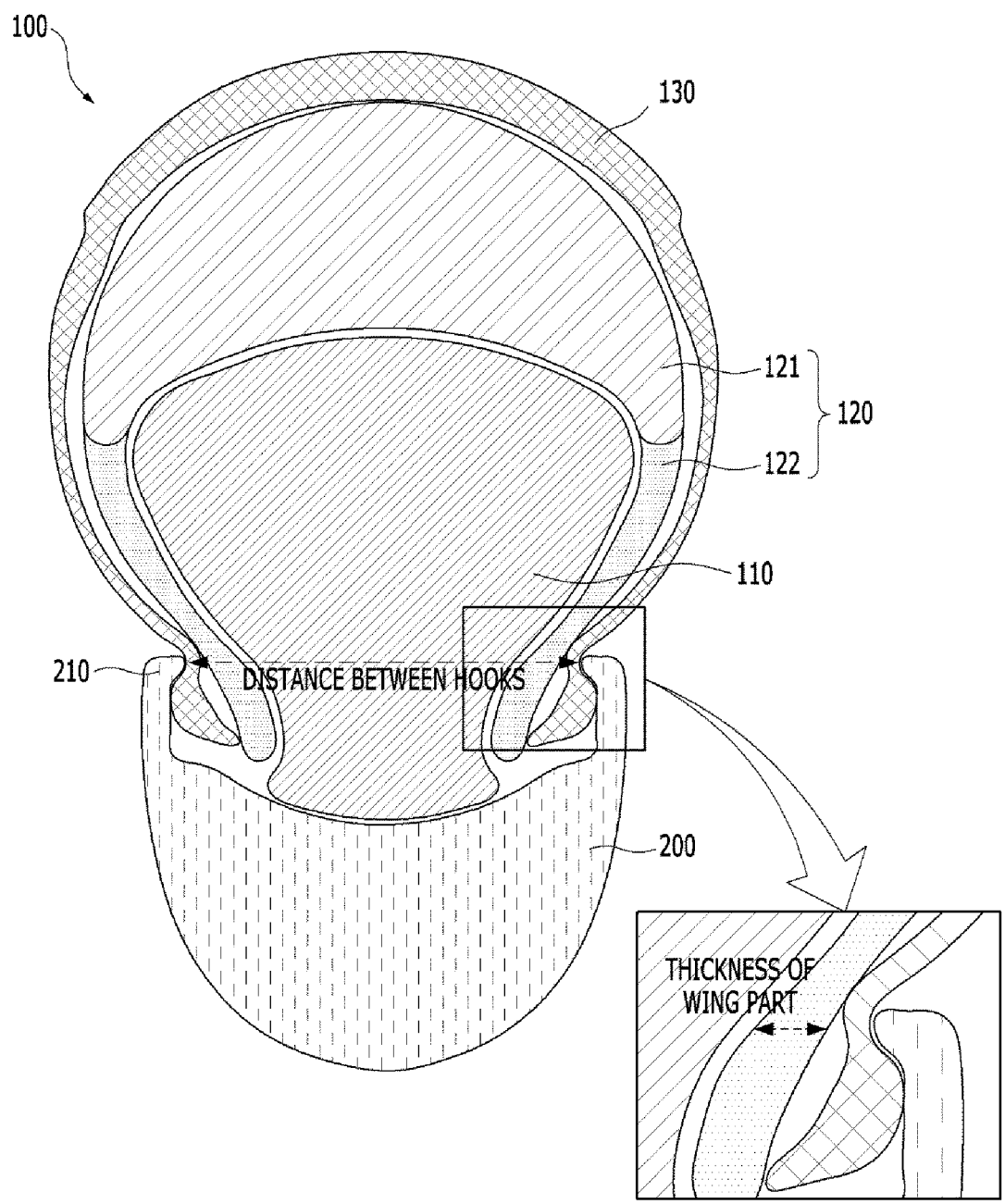
FIG. 8 is a diagram of a tire combining structure according to an embodiment of the present disclosure.

FIG. 8 is a diagram of a tire combining structure according to an embodiment of the present disclosure.

To be specific, FIG. 8 is a plan view illustrating a distance between the hooks of the tire combining structure and a thickness of the wing part according to an embodiment of the present disclosure.

When the thickness of the wing part is less than 3% of the distance between the both hooks of the rim, while the tire structure 100 rolls during a ride, the air tube 110 may be drawn (swallowed) into a space between the body part 121 and the tire outer layer 130, and, thus, the air tube 110 may be torn and punctured, like the case where the wing part 122 is not present or the lower end of the wing part 122 is placed above the upper surface of the rim.

When the thickness of the wing part is more than 30% of the distance between the both hooks of the rim, it is difficult to combine the tire structure 100 to the rim 200. If the tire structure 100 is not easily combined but forced to be mounted to the rim 200 and then is used for a ride, the air tube 110 may be twisted or folded or the core 120 may be twisted, which may cause a puncture or deviation of the tire structure 100 from the rim 200.

Hereinafter, the present disclosure will be described in more detail with reference to Example. The following Example is provided only for explanation, but does not intend to limit the scope of the present disclosure.

Example 7

As the conditions of Example 7, a tire ETRTO 37-622 was used and a minimum tire air pressure for external display was set to 80 psi as an air pressure of an air tube.

In the test of Example 7, when the tire rolled clockwise while the tire was in contact with a drum, the drum rolled counterclockwise, and, thus, the mileage of the tire could be checked. In this case, the drum rolled at a speed of 50 km/h and had a weight of 70 kg, and the mileage was 500 km.

In each case where the distance between the both hooks was 16 mm, 21 mm, and 33 mm, the presence or absence of a puncture depending on a ratio y/x between a distance x between the both hooks and a thickness y of the wing part y was checked, and the results thereof were as shown in Table 8 to Table 10, respectively.

<Evaluation Criteria>
Presence of puncture: O
Absence of puncture: X

TABLE 8

| Distance between both hooks (mm) (x) | Thickness of wing (mm) (y) | y/x ratio (%) | Presence or absence of puncture |
|---|---|---|---|
| 16 | 0.5 | 3.1% | O |
| 16 | 0.6 | 3.8% | O |
| 16 | 0.7 | 4.4% | O |
| 16 | 0.8 | 5.0% | O |
| 16 | 0.9 | 5.6% | O |
| 16 | 1 | 6.3% | X |
| 16 | 1.1 | 6.9% | X |

TABLE 8-continued

| Distance between both hooks (mm) (x) | Thickness of wing (mm) (y) | y/x ratio (%) | Presence or absence of puncture |
|---|---|---|---|
| 16 | 1.2 | 7.5% | X |
| 16 | 1.4 | 8.8% | X |
| 16 | 1.6 | 10.0% | X |
| 16 | 1.8 | 11.3% | X |
| 16 | 2 | 12.5% | X |
| 16 | 2.2 | 13.8% | X |
| 16 | 2.4 | 15.0% | X |
| 16 | 2.6 | 16.3% | X |
| 16 | 2.8 | 17.5% | X |
| 16 | 3 | 18.8% | X |
| 16 | 3.2 | 20.0% | X |
| 16 | 3.4 | 21.3% | X |
| 16 | 3.6 | 22.5% | X |
| 16 | 3.8 | 23.8% | X |
| 16 | 4 | 25.0% | X |
| 16 | 4.2 | 26.3% | X |
| 16 | 4.4 | 27.5% | X |
| 16 | 4.6 | 28.8% | X |
| 16 | 4.8 | 30.0% | X |
| 16 | 5 | 31.3% | O |
| 16 | 5.2 | 32.5% | O |
| 16 | 5.4 | 33.8% | O |
| 16 | 5.6 | 35.0% | O |
| 16 | 5.8 | 36.3% | O |
| 16 | 6 | 37.5% | O |

TABLE 9

| Distance between both hooks (mm) (x) | Thickness of wing (mm) (y) | y/x ratio (%) | Presence or absence of puncture |
|---|---|---|---|
| 21 | 0.5 | 2.4% | O |
| 21 | 0.6 | 2.9% | O |
| 21 | 0.7 | 3.3% | O |
| 21 | 0.8 | 3.8% | O |
| 21 | 0.9 | 4.3% | O |
| 21 | 1 | 4.8% | X |
| 21 | 1.1 | 5.2% | X |
| 21 | 1.2 | 5.7% | X |
| 21 | 1.4 | 6.7% | X |
| 21 | 1.6 | 7.6% | X |
| 21 | 1.8 | 8.6% | X |
| 21 | 2 | 9.5% | X |
| 21 | 2.2 | 10.5% | X |
| 21 | 2.4 | 11.4% | X |
| 21 | 2.6 | 12.4% | X |
| 21 | 2.8 | 13.3% | X |
| 21 | 3 | 14.3% | X |
| 21 | 3.2 | 15.2% | X |
| 21 | 3.4 | 16.2% | X |
| 21 | 3.6 | 17.1% | X |
| 21 | 3.8 | 18.1% | X |
| 21 | 4 | 19.0% | X |
| 21 | 4.2 | 20.0% | X |
| 21 | 4.4 | 21.0% | X |
| 21 | 4.6 | 21.9% | X |
| 21 | 4.8 | 22.9% | X |
| 21 | 5 | 23.8% | X |
| 21 | 5.2 | 24.8% | X |
| 21 | 5.4 | 25.7% | X |
| 21 | 5.6 | 26.7% | X |
| 21 | 5.8 | 27.6% | X |
| 21 | 6 | 28.6% | X |
| 21 | 6.2 | 29.5% | X |
| 21 | 6.4 | 30.5% | X |
| 21 | 6.6 | 31.4% | O |
| 21 | 6.8 | 32.4% | O |
| 21 | 7 | 33.3% | O |
| 21 | 7.2 | 34.3% | O |

TABLE 10

| Distance between both hooks (mm) (x) | Thickness of wing (mm) (y) | y/x ratio (%) | Presence or absence of puncture |
|---|---|---|---|
| 33 | 0.5 | 1.5% | ○ |
| 33 | 0.6 | 1.8% | ○ |
| 33 | 0.8 | 2.4% | ○ |
| 33 | 1 | 3.0% | X |
| 33 | 1.1 | 3.3% | X |
| 33 | 1.2 | 3.6% | X |
| 33 | 1.4 | 4.2% | X |
| 33 | 1.6 | 4.8% | X |
| 33 | 1.8 | 5.5% | X |
| 33 | 2 | 6.1% | X |
| 33 | 2.2 | 6.7% | X |
| 33 | 2.4 | 7.3% | X |
| 33 | 2.6 | 7.9% | X |
| 33 | 2.8 | 8.5% | X |
| 33 | 3 | 9.1% | X |
| 33 | 3.2 | 9.7% | X |
| 33 | 3.4 | 10.3% | X |
| 33 | 3.6 | 10.9% | X |
| 33 | 3.8 | 11.5% | X |
| 33 | 4 | 12.1% | X |
| 33 | 4.2 | 12.7% | X |
| 33 | 4.4 | 13.3% | X |
| 33 | 4.6 | 13.9% | X |
| 33 | 4.8 | 14.5% | X |
| 33 | 5 | 15.2% | X |
| 33 | 5.2 | 15.8% | X |
| 33 | 5.4 | 16.4% | X |
| 33 | 5.6 | 17.0% | X |
| 33 | 5.8 | 17.6% | X |
| 33 | 6 | 18.2% | X |
| 33 | 6.2 | 18.8% | X |
| 33 | 6.4 | 19.4% | X |
| 33 | 6.6 | 20.0% | X |
| 33 | 6.8 | 20.6% | X |
| 33 | 7 | 21.2% | X |
| 33 | 7.2 | 21.8% | X |
| 33 | 7.4 | 22.4% | X |
| 33 | 7.6 | 23.0% | X |
| 33 | 7.8 | 23.6% | X |
| 33 | 8 | 24.2% | X |
| 33 | 8.2 | 24.8% | X |
| 33 | 8.4 | 25.5% | X |
| 33 | 8.6 | 26.1% | X |
| 33 | 8.8 | 26.7% | X |
| 33 | 9 | 27.3% | X |
| 33 | 9.2 | 27.9% | X |
| 33 | 9.4 | 28.5% | X |
| 33 | 9.6 | 29.1% | X |
| 33 | 9.8 | 29.7% | X |
| 33 | 10 | 30.3% | X |
| 33 | 10.2 | 30.9% | ○ |
| 33 | 10.4 | 31.5% | ○ |
| 33 | 10.6 | 32.1% | ○ |
| 33 | 10.8 | 32.7% | ○ |
| 33 | 11 | 33.3% | ○ |

According to the results shown in Table 8 to Table 10, it can be seen that when the thickness of the wing part was from 3% to 30% or less of the distance between the both hooks of the rim, a puncture was not observed.

According to an embodiment of the present disclosure, in a state where the air tube is inflated, an angle of a tangent line at a contact point between a vertical extension of a wall surface of the rim and the tire outer layer may be in the range of from 20° to 80°, but may not be limited thereto.

Figure 9:
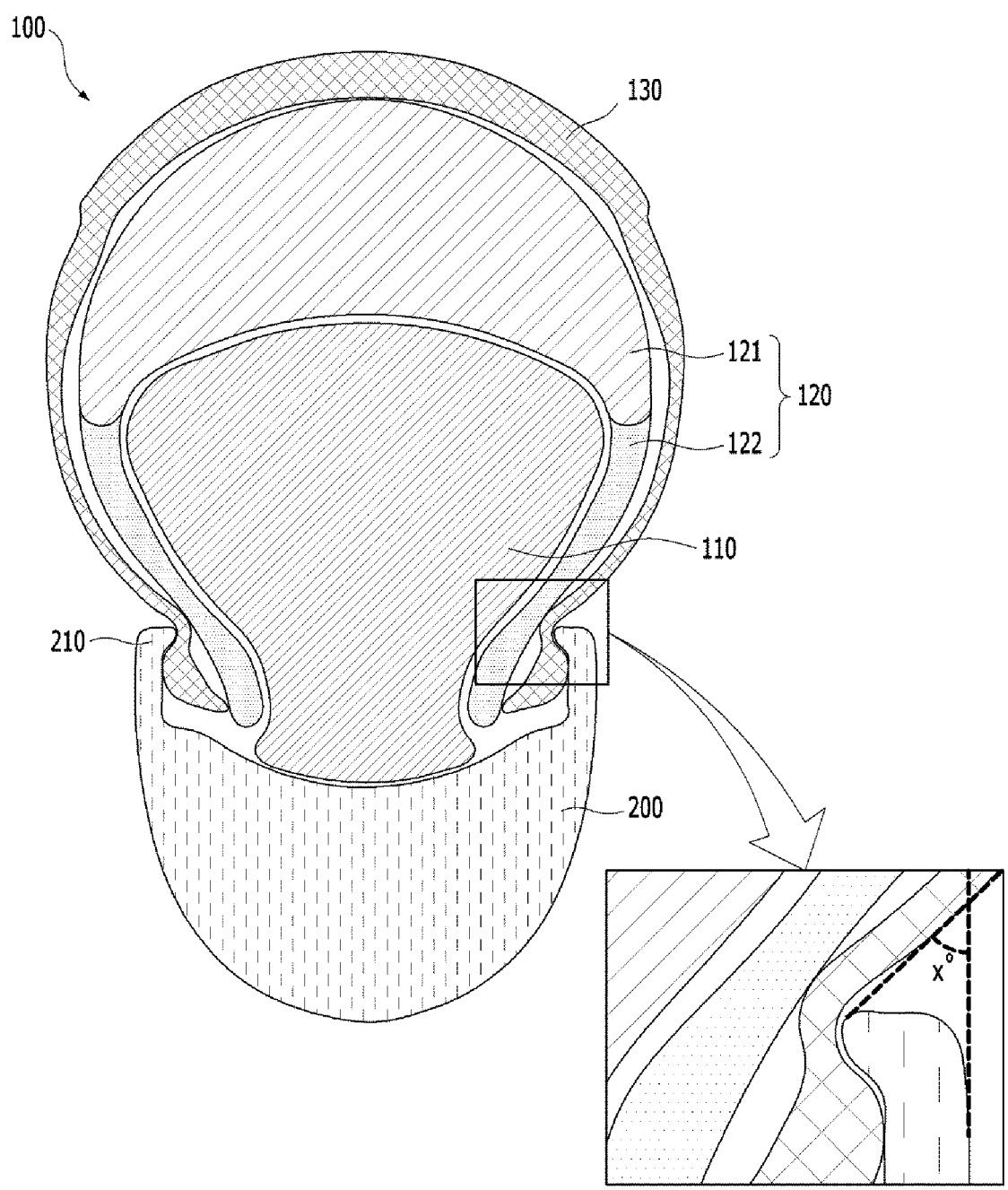
FIG. 9 is a diagram illustrating a tire combining structure according to an embodiment of the present disclosure.

FIG. 9 is a diagram illustrating a tire combining structure according to an embodiment of the present disclosure.

To be specific, FIG. 9 is a plan view showing an angle x° of a tangent line at a contact point between a vertical extension of a wall surface of the rim 200 and the tire outer layer 130 in a state where the air tube 110 is inflated.

When the angle is less than 20° or more than 80°, the ride comfort of the bicycle with the tire may deteriorate.

Example 8

As the conditions of Example 8, a tire ETRTO 37-622 was used and a minimum tire air pressure for external display was set to 80 psi as an air pressure of an air tube.

The angle of the tangent line at the contact point between the vertical extension of the wall surface of the rim and the tire outer layer was adjusted by adjusting a length of the diameter of the core of the tire.

The elastic repulsive force, the vibration, and the difference between maximum and minimum of rolling resistance were checked to check the ride comfort of the tire.

The elastic repulsive force was measured in the unit cm as the greatest height of the tire combined with a wheel when it bounded from the ground from the ground after falling down from 1 m above the ground.

The vibration was measured using a vibrator capable of measuring μm, and after a ride at the same speed for 5 minutes to keep the balance of the tire, an average value during a period of time from 20 seconds to 140 seconds after the start of rolling was obtained.

The rolling resistance was measured using a torque cell, and after idling for 5 minutes, rolling resistance values during a period of time from 20 seconds to 140 seconds after the start of rolling were obtained, and after a maximum value and a minimum value in the measurement section were measured, a difference between the maximum value and the minimum value was represented as a difference between maximum and minimum of rolling resistance.

The elastic repulsive force, the vibration, and the difference between maximum and minimum of rolling resistance depending on the angle of the tangent line at the contact point between the vertical extension of the wall surface of the rim and the tire outer layer were as shown in Table 11.

<Evaluation Criteria>

Elastic repulsive force: The elastic repulsive force was evaluated as satisfactory when it was 40 cm or more.

Vibration: The vibration was evaluated as satisfactory when a vibration displacement was 150 μm or less.

Difference between maximum and minimum of rolling resistance: The difference between maximum and minimum of rolling resistance was evaluated as satisfactory when a difference between a maximum value and a minimum value of the rolling resistance was 20 W or less.

TABLE 11

| Angle of tangent line at contact point between vertical extension of wall surface of rim and tire outer layer (°) | Elastic repulsive force | Vibration | Difference between maximum and minimum of rolling resistance at tangent angle | | |
|---|---|---|---|---|---|
| | | | Maximum value | Minimum value | Difference |
| 15° | 36 cm | 115 μm | 46 w | 20 w | 26 w |
| 25° | 40 cm | 120 μm | 41 w | 21 w | 20 w |
| 35° | 41 cm | 122 μm | 41 w | 22 w | 19 w |
| 45° | 43 cm | 126 μm | 39 w | 21 w | 18 w |
| 55° | 48 cm | 134 μm | 37 w | 19 w | 18 w |
| 65° | 52 cm | 137 μm | 37 w | 18 w | 19 w |
| 75° | 56 cm | 146 μm | 36 w | 19 w | 17 w |
| 85° | 58 cm | 186 μm | 45 w | 18 w | 27 w |

According to the results shown in Table 11, the elastic repulsive force was satisfactory at the angle of 20° or more, the vibration was satisfactory at the angle of 80° or less, and the difference between maximum and minimum of rolling resistance was satisfactory at the angle of 20° or more and 80° or less.

Referring to the results of Example 8 as shown in Table 11, an angle of a tangent line at a contact point between a vertical extension of a wall surface of the rim and the tire outer layer may be in the range of from 20° to 80° or less, but may not be limited thereto. Desirably, the angle may be in the range of from 25° to 70° or less, but may not be limited thereto.

According to an embodiment of the present disclosure, a contact portion where the tire outer layer, the core, and the air tube are all in contact with each other may be present in a space under the upper surface of the rim, but may not be limited thereto.

To be specific, since the contact portion where the tire outer layer 130, the wing part 122 of the core 120, and the air tube 110 are all in contact with each other is present in the space under the upper surface of the rim 200, it is possible to suppress tears of the air tube 110 by external shock or punctures of the air tube 110 when drawn into the space between the body part 121 of the core 120 and the tire outer layer 130 during a ride.

A third aspect of the present disclosure provides a bicycle including the tire combining structure.

Detailed descriptions of the bicycle of the third aspect of the present disclosure, which overlap with those of the first aspect and the second aspect of the present disclosure, are omitted hereinafter, but the descriptions of the first aspect and the second aspect of the present disclosure may be identically applied to the third aspect of the present disclosure, even though they are omitted hereinafter.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments/examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A tire and rim assembly comprising:
a rim including hooks; and
a tire structure combined with the rim,
wherein the tire structure comprises:
an air tube;
a core provided on the air tube; and
a tire outer layer provided on the core,
wherein the core includes a body part positioned above a transverse diameter of the air tube and a wing part positioned under the transverse diameter of the air tube,
a lower end of the wing part is placed under an upper surface of the rim,
wherein, when the air tube is inflated, a ratio B/A between a transverse diameter A of the air tube and a distance B between the hooks is 0.75 or less, and
wherein, when the air tube is inflated, a ratio D/C between a length C from an upper end of the air tube to a boundary corresponding to the transverse diameter and a length D from the boundary to a lower end of the air tube is 3.3 or less.

2. The tire combining structure of claim 1,
wherein, when the air tube is inflated, a compression ratio of thickness for the body part of the core is from 10% to 50%.

3. The tire combining structure of claim 1,
wherein, when the air tube is inflated, a compressed thickness of the body part includes a length in a range of 70% or less of a transverse outer diameter of the tire structure.

4. The tire combining structure of claim 1,
wherein the core has a shore C hardness of from 20 to 80.

5. The tire combining structure of claim 1,
wherein the core and the tire outer layer have a shore C hardness ratio of from 0.2 to 1.

6. The tire combining structure of claim 1,
wherein a thickness of the wing part positioned at a contact portion between the hooks of the rim and the tire outer layer is from 3% to 30% of the distance B between the hooks of the rim.

7. The tire combining structure of claim 1,
wherein, in a state where the air tube is inflated, an angle of a tangent line at a contact point between a vertical extension of a wall surface of the rim and the tire outer layer is in a range of from 20° to 80°.

8. The tire combining structure of claim 1,
wherein a contact portion where the tire outer layer, the core, and the air tube are all in contact with each other is present in a space under the upper surface of the rim.

9. A bicycle including the tire and rim assembly of claim 1.

* * * * *